(12) United States Patent
Kinoshita et al.

(10) Patent No.: US 6,353,527 B2
(45) Date of Patent: Mar. 5, 2002

(54) VARIABLE CAPACITOR

(75) Inventors: Motohiro Kinoshita, Takefu (JP); Takeshi Doi, Jiangsu (CN); Yukinori Ueda, Fukui-ken (JP)

(73) Assignee: Murata Manufacturing Co., LTD, Kyoto (JP)

( * ) Notice: Subject to any disclaimer, the term of this patent is extended or adjusted under 35 U.S.C. 154(b) by 0 days.

(21) Appl. No.: 09/758,687

(22) Filed: Jan. 11, 2001

(30) Foreign Application Priority Data

Jan. 11, 2000 (JP) .......................... 12-002786

(51) Int. Cl.[7] ................................. H01G 5/00
(52) U.S. Cl. .................. 361/277; 361/278; 361/298; 361/289; 361/292; 174/386
(58) Field of Search ................ 361/277, 278, 361/752, 289, 292, 299.2, 298.1, 298, 293; 174/386

(56) References Cited

U.S. PATENT DOCUMENTS

| | | | | |
|---|---|---|---|---|
| 4,366,402 A | * | 12/1982 | Marsoner ..................... | 310/68 |
| 4,490,772 A | * | 12/1984 | Blickstein .................... | 361/281 |
| 5,461,535 A | * | 10/1995 | Kishishita et al. ........ | 361/298.1 |
| 5,804,895 A | * | 9/1998 | Tsuzaki et al. ............... | 310/40 |
| 6,023,406 A | * | 2/2000 | Kinoshita et al. ........... | 361/277 |
| 6,101,084 A | * | 8/2000 | Rokov ..................... | 361/301.2 |
| 6,134,097 A | * | 10/2000 | Shibata .................... | 361/298.1 |
| 6,226,168 B1 | * | 5/2001 | Shibata ........................ | 361/277 |
| 6,274,955 B1 | * | 8/2001 | Satoh et al. .................. | 310/71 |

* cited by examiner

*Primary Examiner*—Dean A. Reichard
*Assistant Examiner*—Nguyen T Ha
(74) *Attorney, Agent, or Firm*—Keating & Bennett, LLP

(57) ABSTRACT

A variable capacitor includes a driver member including one metal sheet, a head having a driver groove provided therein, engagement portions engaged with a rotor, and a spring function portion in pressure-contact with the rotor are integral with each other. The spring function portion includes a first plate portion extending from one end of the head, which is bent in the first bending portion, and elongated, passing a center shaft, and a second plate portion extending from the end of the first plate portion, which is bent in the second bending portion, and elongated, passing the center shaft. The second plate portion functions as a pressure-contact portion for the rotor.

18 Claims, 10 Drawing Sheets

VARIABLE CAPACITOR

BACKGROUND OF THE INVENTION

1. Field of the Invention

The present invention relates to a variable capacitor, and more particularly, to a variable capacitor in which the effective opposing area between a stator and a rotor is varied by the rotation of the stator with respect to the rotor, whereby the electrostatic capacitance is adjusted.

2. Description of the Related Art

In one conventional variable capacitor, the effective opposing area between the stator and the rotor is varied by the rotation of the rotor with respect to the stator, whereby the capacity is adjusted.

In a variable capacitor of the type described above, a driver member is constructed to be rotated by a tool such as a screwdriver or other suitable tool and rotate a rotor, caused by the rotation transmitted to the rotor.

In many of the above-described conventional variable capacitors, the rotor is stably contacted with a stator while the rotor is rotated, such that an adjusted electrostatic capacitance is maintained constant. Moreover, in many cases, a spring member is disposed between the above-mentioned driver member and the rotor.

The driver and spring members as described above are provided as separate members and are joined to each other by welding, crimping, or other suitable joining method, as described in, e.g., Japanese Unexamined Patent Application Publication No. 3-141628 or Japanese Unexamined Patent Application Publication No. 8-306587.

These publications disclose a spring member provided with spring function portions extending radially in four directions from the center axial line of the driver member.

However, the above-described conventional variable capacitors have problems, especially with respect to the driver members and the spring members.

First, it is necessary to configure the driver member and the spring member as separate components. Thus, the number of components is increased, and moreover, a process for integrating these two members is required.

Furthermore, only a spring function portion having a length smaller than the radius of the driver member can be disposed in the driver member. Thus, the width is relatively small. Accordingly, the elastic range is narrow, and the spring property is often insufficient. If an overload is applied to the spring function portion, the portion plastically deforms. Moreover, the spring property of the spring function portion extending in each of the four directions varies.

As a result, the contact of the rotor with the stator is unstable. Therefore, the adjusted electrostatic capacitance is unstable, and moreover, torque generated by the rotation-operation of the rotor is not constant.

SUMMARY OF THE INVENTION

To overcome the above-described problems with the prior art, preferred embodiments of the present invention provide a variable capacitor having a stator fixedly disposed and defining a stator electrode, a rotor disposed rotatably in contact with the stator and having a rotor electrode opposed to the stator electrode via a dielectric member, an electrically conductive driver member which is rotation-operated so as to rotate the rotor and including an engagement portion engaged with the rotor such that the rotation is transmitted to the rotor, and a driver groove provided to perform the rotation-operation, an electrically conductive center shaft rotatably supporting the rotor and the driver member and being electrically connected to the driver member, a stator terminal electrically connected to the stator electrode, and a rotor terminal electrically connected to the center shaft.

To solve the above-described technical problems, the variable capacitor of various preferred embodiments of the present invention includes the following features.

The driver member preferably includes one metal sheet in which a head having a driver groove positioned therein and the engagement portion are integrally provided together with the spring function portion pressure-contacted with the rotor to elastically press the rotor against the stator.

Furthermore, the spring function portion includes a plate portion extending from one end of the head, which is bent from the one end of the head and is elongated, passing the center shaft. This plate portion functions as a pressure-contact component for the rotor.

Preferably, the spring function portion includes a first plate portion extending from one end of the head, which is bent in a first bending portion, and extending along the underside of the head, passing the center shaft, and a second plate portion extending from the end of the first plate portion, which is bent in a second bending portion, and extending along the underside of the first plate portion, passing the center shaft, the second plate portion functioning as a pressure-contact component for the rotor.

Also preferably, a gap is provided between the first plate portion and the second plate portion.

The spring function portion further includes a support portion provided by bending the end portion of the second plate portion in a direction such that the end portion approaches the underside of the head.

Preferably, the second plate portion includes a projected portion provided in the pressure-contact component for the rotor.

Also preferably, the first bending portion includes a through-hole provided in the approximate center in the width direction thereof.

In addition, preferably, the spring function portion is further provided with a pair of auxiliary pressure-contact portions, each extending from the sides of the first plate portion to approach the upper side of the rotor.

Preferably, the rotor includes a pair of engagement walls extending substantially vertically and facing in the same direction, the center shaft member is arranged between the engagement walls, and the engagement portions of the driver member are in contact with the pair of the engagement walls, respectively.

The rotor is configured in the shape of a substantially semi-circular sheet, of which the underside defines a substantially semi-circular rotor electrode. In the rotor having such a configuration, the linear portions of the substantially semi-circular shape of the rotor define the pair of the engagement walls.

Also preferably, the engagement portions are configured to extend from the second plate portions.

The cut end-surfaces of the engagement portions are engaged with the pair of the engagement walls. Preferably, bent ends having a bent shape are provided in the free ends of the engagement portions, respectively, and the bent ends of the engagement portions are engaged with the pair of the engagement walls.

Moreover, preferably, the engagement portions are engaged with the outermost ends of a pair of the engagement walls.

In the variable capacitor of a preferred embodiment of the present invention, the head provided in the driver member is preferably dish-shaped, and preferably, the driver groove is provided in the side surface of the head. More preferably, the driver groove is configured such that it does not extend to the bottom of the dish-shaped head.

Also preferably, the center shaft and the rotor terminal are preferably integral with each other.

In the above case, preferably, the variable capacitor is further provided with a case made of resin, the case having a concavity fixedly accommodating the stator, and rotatably accommodating the rotor and the driver member, and being formed by insert-molding with the stator terminal and the rotor terminal.

Also preferably, the stator is made of a dielectric having the stator electrode provided on the underside thereof, the rotor is electrically conductive and is disposed on the upper side of the stator rotatably in contact with the upper side of the stator, and the rotor electrode is provided on the underside of the rotor to be opposed to the stator electrode via the stator.

Other features, elements, characteristics and advantages of the present invention will become more apparent from the detailed description of preferred embodiments thereof with reference to the drawings.

DETAILED DESCRIPTION OF PREFERRED EMBODIMENTS

Figure 1:
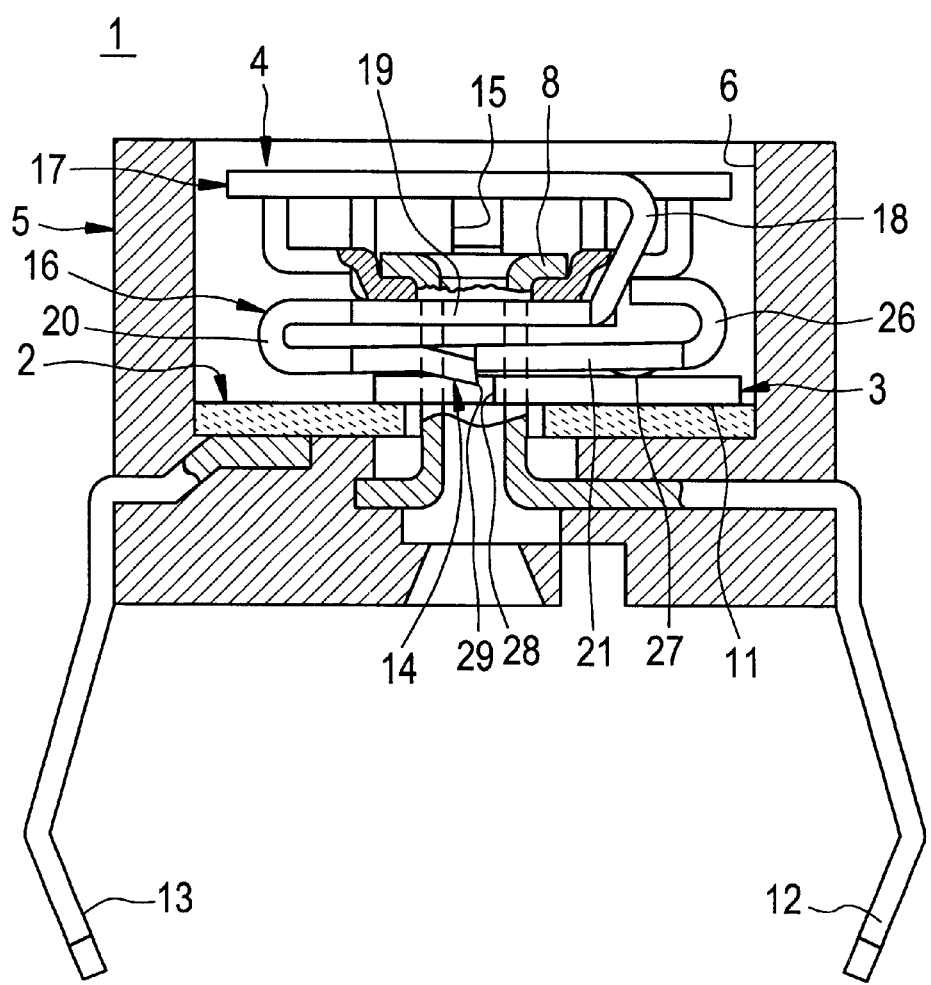
FIG. 1 is a partial cross sectional front view of a variable capacitor 1 according to a first preferred embodiment of the present invention.

FIGS. 1 to 10 illustrate a variable capacitor 1 according to a first preferred embodiment of the present invention. FIG. 1 is a partial cross-sectional front view of a variable capacitor 1. FIG. 2A is an exploded perspective view showing the plurality of components of the variable capacitor 1. FIG. 2B is a perspective view of the stator of the variable capacitor 1. FIGS. 3 to 10 each show the components of FIG. 2.

As shown in FIG. 2A, the variable capacitor 1 is disassembled into the respective components including a stator 2, a rotor 3, a driver member 4, and a case 5. The novel driver member 4 will be described later in detail. First, the stator 2, the rotor 3, and the case 5 will be described below.

The stator 2 is specifically shown in FIGS. 2A and 2B. FIG. 2A shows the upper side of the stator 2, while FIG. 2B shows the underside of the stator 2. The stator 2 is preferably made of a dielectric such as a dielectric ceramic or other suitable dielectric material, and is fixedly disposed in a cavity 6 of the case 5. A stator electrode 7 is provided on the underside of the stator 2. Furthermore, a through-hole 9 to receive a center shaft 8 fixed to the case 5 is provided in the stator 2.

The rotor 3 is arranged on the upper side of the stator 2 and in contact with the upper side of the stator 2, as shown in FIG. 1. The rotor 3 includes a through-hole 10, accommodated in the cavity 6 of the case 5 with the center shaft 8 being received in the through-hole 10. The rotor is rotated on the center shaft 8 in the cavity 6, particularly as is clearly shown in FIGS. 2A and 8.

Moreover, the rotor 3 includes a substantially semicircular rotor electrode 11 on the underside thereof. The rotor electrode 11 is opposed to a stator electrode 7 via the stator 2, and thereby, a capacitance is produced between the rotor electrode 11 and the stator electrode 7, which is correlated to the effective opposing area between the rotor electrode 11 and the stator electrode 7.

The above-described rotor 3 is produced by etching an electrically conductive metal material, or other suitable methods.

Figure 2:
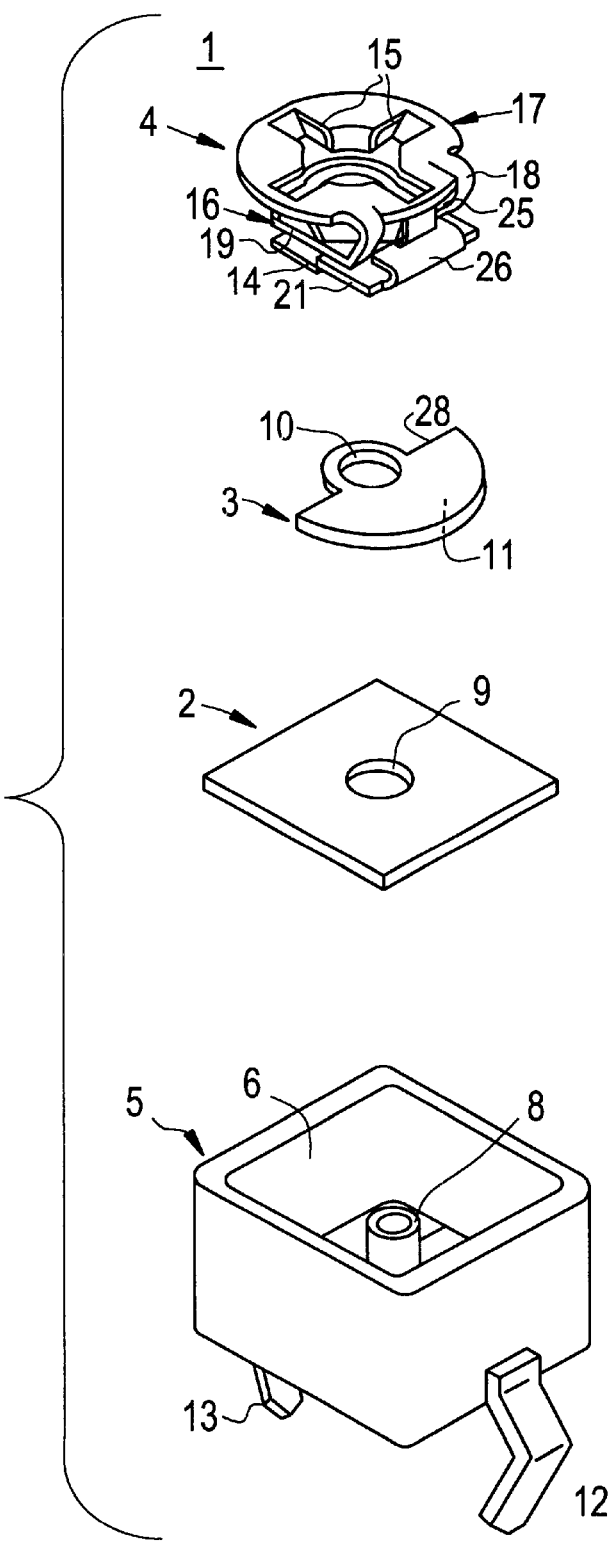
FIG. 2A is an exploded perspective view of the plurality of components provided in the variable capacitor 1 shown in FIG. 1.
FIG. 2B is a perspective view showing the underside of a stator 2 shown in FIG. 2.
Figure 9:
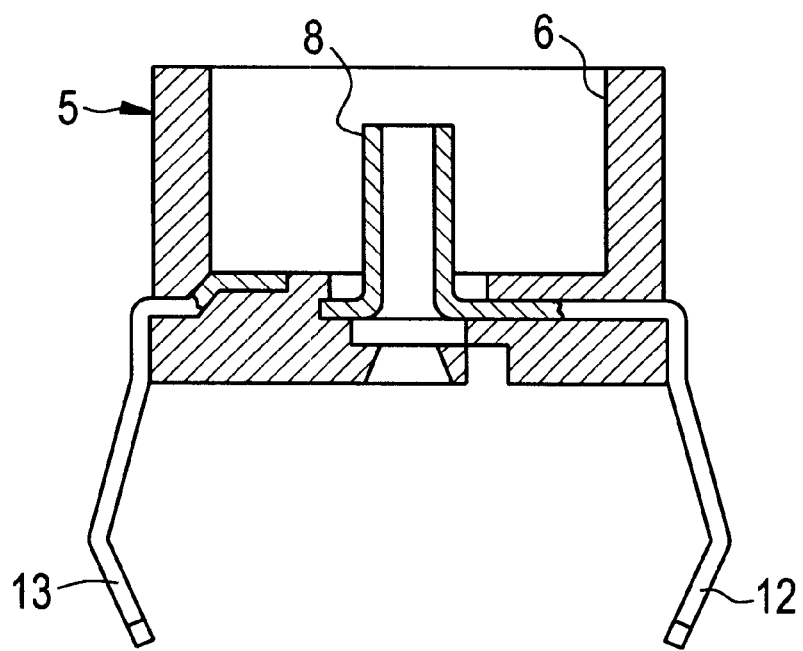
FIG. 9 is a cross-sectional view of a case 5 shown in FIG. 1.
Figure 10:
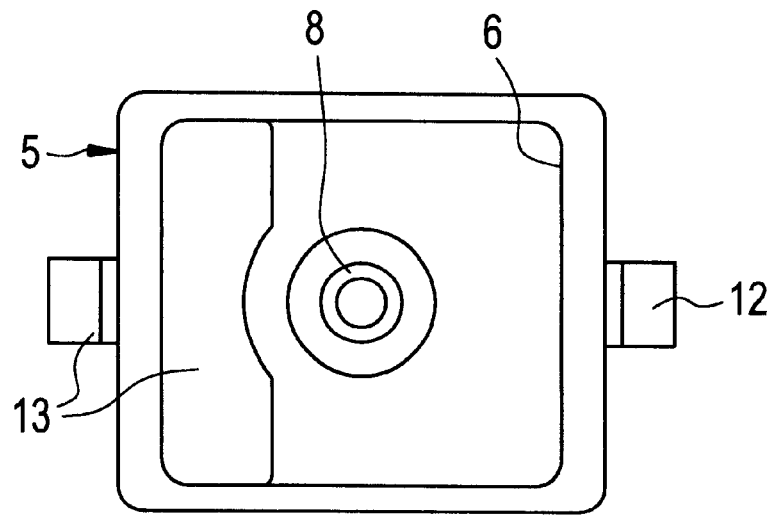
FIG. 10 is a plan view of the case 5 shown in FIG. 9.

The case 5 is shown not only in FIGS. 1 and 2 but also in FIGS. 9 and 10, individually.

Particularly as is shown clearly in FIGS. 1 and 9, the center shaft 8 is preferably made of a conductive metal material, and contains a rotor terminal 12 integrated therewith. The case 5 is preferably made of resin, and is formed by insert-molding with the rotor terminal 12 and a stator terminal 13. The case 5 supports the center shaft 8, the rotor terminal 12, and the stator terminal 13.

The stator terminal 13 is exposed at the bottom of the cavity 6 of the case 5. When the stator 2 is accommodated in the concavity 6, as described above, the stator electrode 7 is in contact with the exposed portion of the stator terminal 13, and thereby, the stator terminal 13 and the stator electrode 7 are electrically connected to each other.

Furthermore, the center shaft 8 has a substantially cylindrical shape. In the cavity 6 of the case 5, the stator 2, the rotor 3, and the driver member 4 are accommodated along the center shaft 8, and thereafter, the end of the center shaft 8 is crimped as shown in FIG. 1. Thus, the stator 2, the rotor 3, and the driver member 4 are prevented from being inadvertently separated from the case 5, and moreover, the spring action caused by the driver member 4 is exerted onto the rotor 3.

Figure 3:
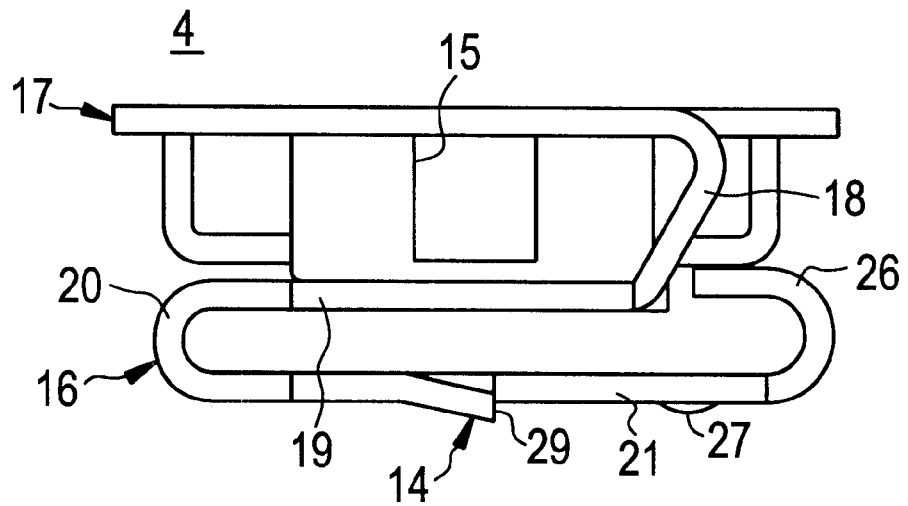
FIG. 3 is a front view of a driver member 4 shown in FIG. 1.

Hereinafter, the details of the driver member 4 will be described. FIG. 3 is a front view of the driver member 4, and FIG. 4 is a right side view thereof.

The driver member 4 is rotation-operated to rotate the rotor 3. For this reason, engagement portions 14 in the driver member 4 are arranged to engage the rotor 3 whereby the rotation of the driver member 4 is transmitted to the rotor 3. Moreover, in the driver member 4, a driver groove 15 to receive a tool, such as a screwdriver to perform the rotation-operation, is provided. Furthermore, a spring function portion 16 is arranged to be in pressure-contact with the rotor 3 to urge the rotor 3 to elastically press against the stator.

The above-mentioned driver member 4 preferably includes a metal sheet. In the driver member 4, a head 17 having the driver groove 15 provided therein, and the engagement portions 14, and the spring function portion 16 are integrally provided with each other. The entire driver member 4 is electrically conductive.

Figure 4:
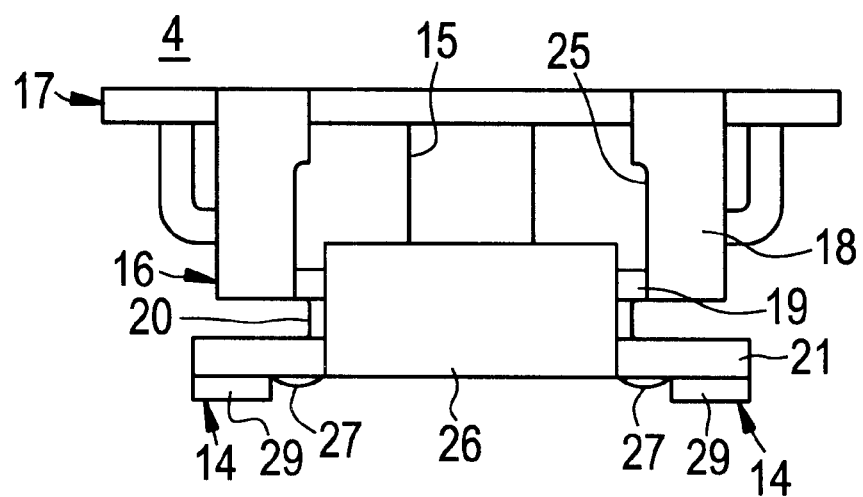
FIG. 4 is a right side view of the driver member 4 shown in FIG. 3.
Figure 5:
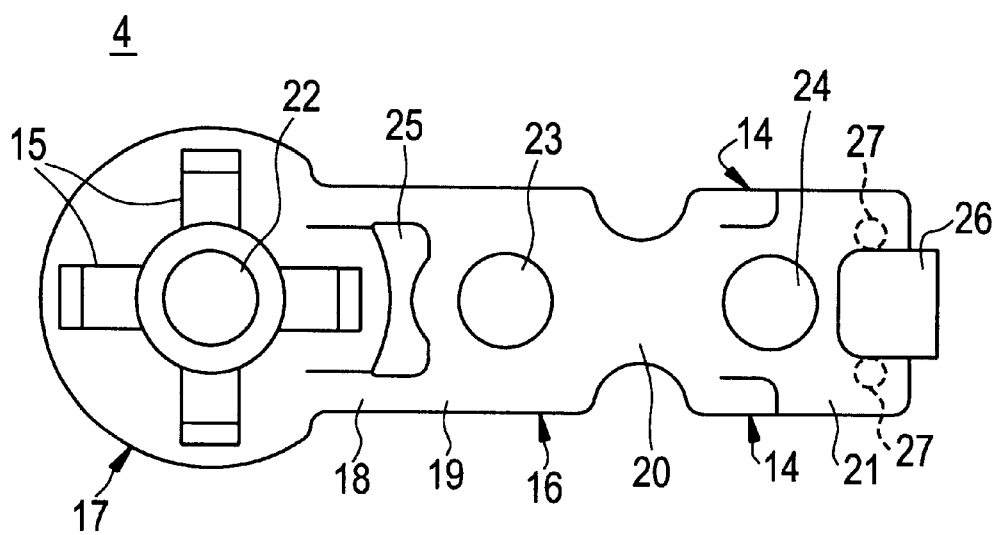
FIG. 5 is a plan view of the driver member 4 shown in FIG. 3, taken before the driver member 4 is bent.
Figure 6:
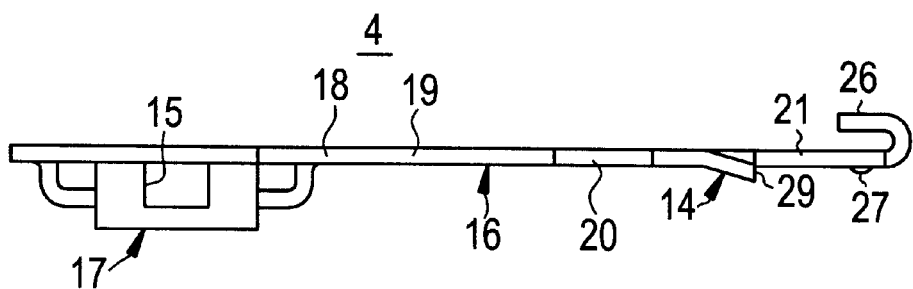
FIG. 6 is a front view of the driver member 4 of FIG. 5.
Figure 7:
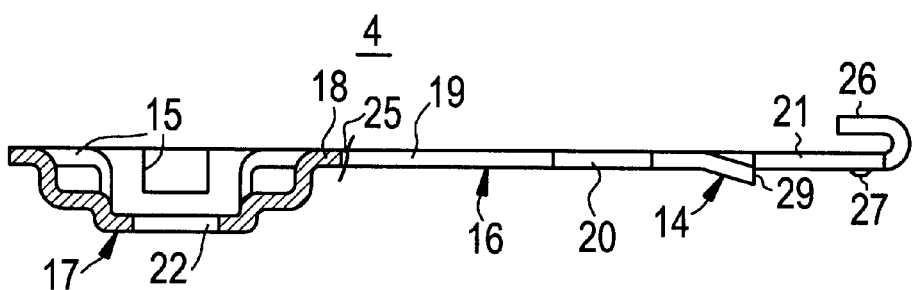
FIG. 7 is a partial cross-sectional front view of the driver member 4 of FIG. 5.

The configuration of the driver member 4 shown in FIGS. 3 and 4 is achieved by bending the metal sheet in desired positions thereof. FIGS. 5 to 7 show the configuration of the driver member 4 before bending is performed. FIG. 5 is a plan view of the driver member 4, FIG. 6 is a front view thereof, and FIG. 7 is a partial cross-sectional front view thereof.

The spring function portion 16 provided in the driver member 4 includes a first plate portion 19 extending from one end of the head 17, which is bent in a first bending portion 18 and then extends along the lower surface of the head 17, passing the center shaft 8, and a second plate portion 21 elongated from the end of the first plate portion 19, which is bent in a second bending portion 20 and then extends along the lower surface of the first plate portion 19, passing the center shaft 8. Moreover, the second plate portion 21 acts as a pressure-contact component for the rotor 3.

In the driver member 4 having the bent shape as described above, through-holes 22, 23, and 24 are provided in the head 17, the first plate portion 19, and the second plate portion 21, respectively, as is clearly shown in FIG. 5. These through-holes 22 to 24 are arranged to be coaxial and to have substantially the same diameter. Thus, the driver member 4, when it rotates on the center shaft 8, has a stable orientation and stable torque. In particular, by configuring the through-holes 22 and 23 to have substantially the same diameter, the area of the crimped portion of the center shaft 8 in contact with the driver member 4 is increased such that a greatly increased torque is obtained.

Moreover, as is clearly shown in FIG. 5, a through-hole 25 is provided in the approximate center in the width direction of the first bending portion 18. In addition, as is clearly seen in FIG. 5, the second bending portion 20 has a neck shape. The through-hole 25 and the neck shape facilitate bending of the metal sheet defining the driver member 4 in the desired portions.

By adjusting the depth of the neck portion in the second bending portion 20, the spring force provided by the spring function portion 16 can be adjusted. Moreover, with the through-hole 25 provided in the first bending portion 18, the first bending portion 18 and the head 17 do not interfere with each other, while the overall dimension in the width direction of the first bending portion 18 is constant, and thereby, stable connection between the head 17 and the first plate portion 19 is achieved.

In this preferred embodiment, the first plate portion 19 is in contact with the lower surface of the head 17, and a gap is provided between the first plate portion 19 and the second plate portion 21. The gap defines the extent to which the spring function portion 16 can be deformed. Preferably, the deformation does not exceed the elastic limit of the second bending portion 20.

Instead of the gap provided between the first and second plate portions 19 and 21, a gap may be provided between the head 17 and the first plate portion 19. Alternatively, gaps may be provided between both the head 17 and the first plate portion 19, and the first and second plate portions 19 and 21, respectively.

When a gap is provided between the first and second plate portions 19 and 21 as in this preferred embodiment, preferably, a support portion 26 is provided in the spring function portion 16 by bending the end portion of the second plate portion 21 in the direction in which the end portion approaches the lower surface of the head 17.

When the end of the center shaft 8 is crimped as described above, the support portion 26 comes into contact with the lower surface of the head 17, supports the lower surface of the head 17, and prevents the second bending portion 20 from exceeding the elastic limit thereof and being plastically deformed. The support portion 26 may be configured to perform spring-action similar to the second bending portion 20. The support portion 26 may alternatively be configured to provide a gap between the head 17 and the support portion 26 after the above-described crimping has been completed.

The shape of the above-described support portion 26 may be different from those shown in the figures, provided that the function of the support portion 26 is maintained.

The second plate portion 21 functions as a pressure-contact component for the rotor 3, as described above. A projecting portion 27 is provided in the second plate portion 21. With the projecting portion 27, elastic pressure from the spring function portion 16 is securely applied on the rotor 3.

In this preferred embodiment, two projected portions 27 are provided in two divided portions of the rotor 3, respectively. The number and locations of the projecting portions 27 may be optionally changed, as long as the function of the projected portions 27 is maintained. Furthermore, the projecting portions 27 are preferably formed by expanding a portion of the metal sheet defining the driver member 4 in this preferred embodiment. Alternatively, the projecting portions 27 may be formed by cut and raising working or other suitable methods.

The engagement portions 14 are configured to extend from the second plate portion 21 by cut and raising a portion of the second plate portion 21. The engagement portions 14 are engaged with the rotor 3 as shown by the broken line in FIG. 8.

Figure 8:
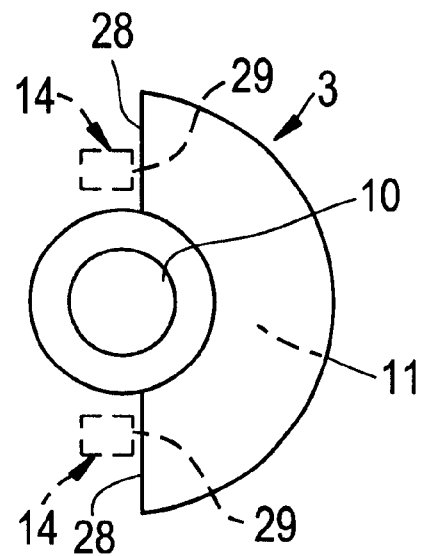
FIG. 8 is a plan view of a rotor 3 shown in FIG. 1.

A pair of engagement walls 28 is provided on the rotor 3 as shown in FIG. 8. These engagement walls 28 are defined by the linear portions of the rotor 3 in the semi-circle defining the planar shape of the rotor 3. The engagement walls 28 are disposed on opposed sides of the through-hole 10, and thus the center shaft 8, and are directed in the same direction, extending substantially vertically (thickness direction). In the engagement portions 14, the cut end surfaces 29 of the metal sheet constituting the driver member 4 are engaged with the pair of the engagement walls 28.

The head 17 provided in the driver member 4 preferably has a dish-shape. The driver grooves 15 are provided on the side surface of the dish-shaped head 17.

In this preferred embodiment, the driver grooves 15 do not extend to the bottom of the dish-shaped head 17, as is clearly shown in FIG. 7. With this configuration even if the driver grooves 15 are deformed when forming, the deformed bottom driver grooves are prevented f from pressing, for example, the second bending portion 20. Such pressing caused by the deformation increases the spring force applied to the stator, which can result in the stator being broken. Therefore, this configuration prevents such an increased spring force from being applied to the stator, and thus prevents the stator from breaking.

When the above-described components are assembled to define the variable capacitor 1 as shown in FIG. 1, the spring function portion 16 is in pressure-contact with the rotor 3 and elastically presses the rotor 3 against the stator 2. Thereby, the rotor electrode 11 provided on the rotor 3 is in close contact with the stator 2.

In addition, by inserting a tool such as a screwdriver or other suitable tool into the driver grooves 15, and rotation-operating the driver member 4, the rotation is transmitted to the rotor 3, such that the rotor 3 is rotated by the engagement portions 14 engaged with the engagement walls 28.

With the above-described rotation of the rotor 3, the effective opposed area between the rotor electrode 11 and the stator electrode 7 which are opposed to each other via the stator 2 is adjusted, and therefore, the electrostatic capacitance produced between the rotor electrode 11 and the stator electrode 7 is adjusted.

The adjusted capacitance is produced between the rotor terminal 12 electrically connected to the rotor electrode 11 and the stator terminal 13 electrically connected to the stator electrode 7.

In this case, the electrical connection between the rotor electrode 11 and the rotor terminal 12 is achieved as follows. The driver member 4 is conductively in contact with the rotor 3 having the rotor electrode 11, then, the center shaft 8 is conductively in contact with the driver member 4, and the center shaft 8 and the rotor terminal 12 are integrated with each other. The electrical connection between the rotor electrode 11 and the rotor terminal 12 is achieved by conductive contact between the rotor 3 and the center shaft 8.

On the other hand, the electrical connection between the stator electrode 7 and the stator terminal 13 can be achieved by conductive direct-connection between the stator electrode 7 and the stator terminal 13.

Hereinafter, other preferred embodiments of the present invention will be described. Similar components in the above-described first preferred embodiment and the other preferred embodiments are designated by the same reference numerals. The description of similar components is omitted, and the constitutions of the other preferred embodiments differing from that of the first preferred embodiment will be described.

Figure 11:
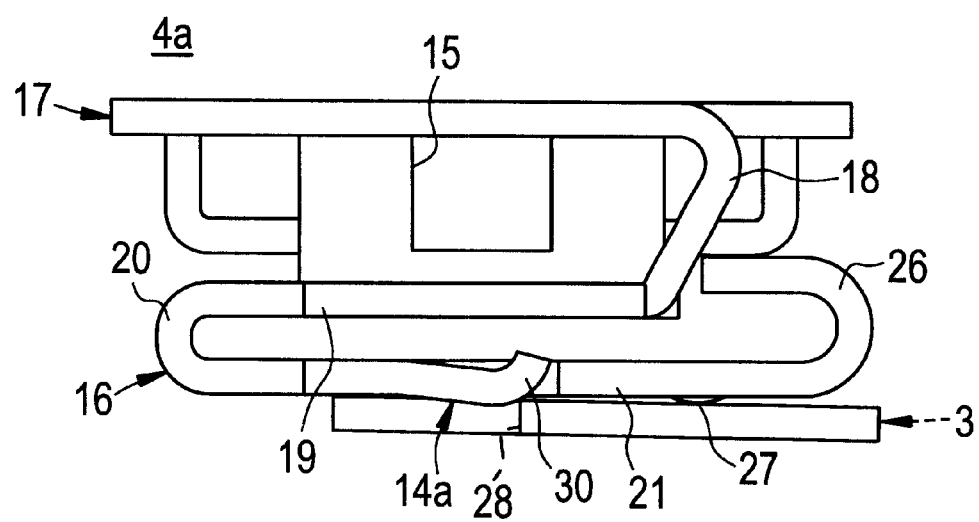
FIG. 11 shows a second preferred embodiment of the present invention, and corresponds to FIG. 3.

FIG. 11 shows a second preferred embodiment of the present invention, and corresponds to FIG. 3.

A driver member 4a shown in FIG. 11 includes engagement portions 14a. That is, on the free ends of the engagement portions 14a, bent ends 30 having a bent shape with a radius are provided. The bent ends 30 of the engagement portions 14a are engaged with a pair of the engagement walls 28, respectively.

In the second preferred embodiment, the bent ends 30 engage the engagement walls 28 of the rotor 3 easily and securely, even if there are variations in size and assembly of the engagement portions 14a and the engagement walls 28 of the rotor 3. Moreover, formation of undesired or unnecessary clearances between the bent ends 30 and the engagement walls 28 are effectively prevented.

Figure 12:
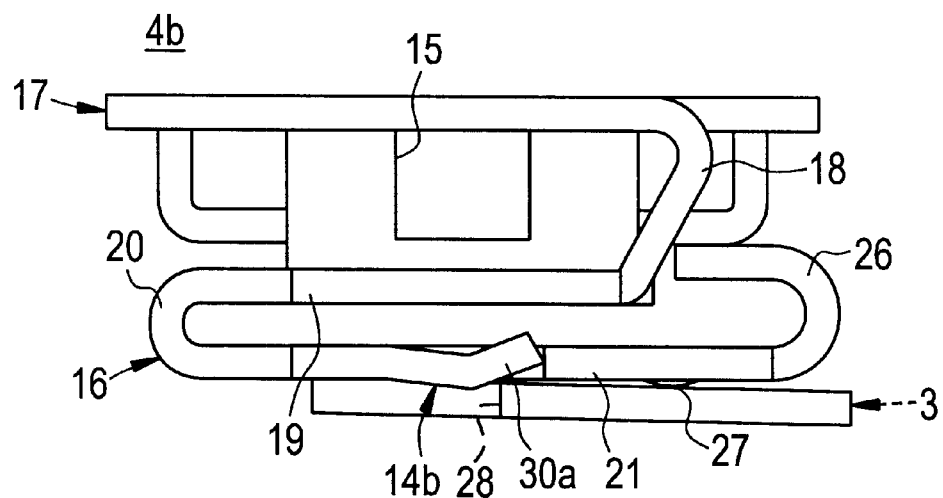
FIG. 12 shows a third preferred embodiment of the present invention, and corresponds to FIG. 3.

FIG. 12 shows a third preferred embodiment of the present invention, and corresponds to FIG. 3 or 11.

The third preferred embodiment of the present invention has the same advantages as the above-described second preferred embodiment. Bent ends 30a provided in the engagement portions 14b of a driver member 4b are formed by V-bending, which is different than the bent ends 30 shown in FIG. 11.

In the third preferred embodiment having the same advantages as the second preferred embodiment, further advantageously, bent ends 30a are easily formed.

Figure 13:
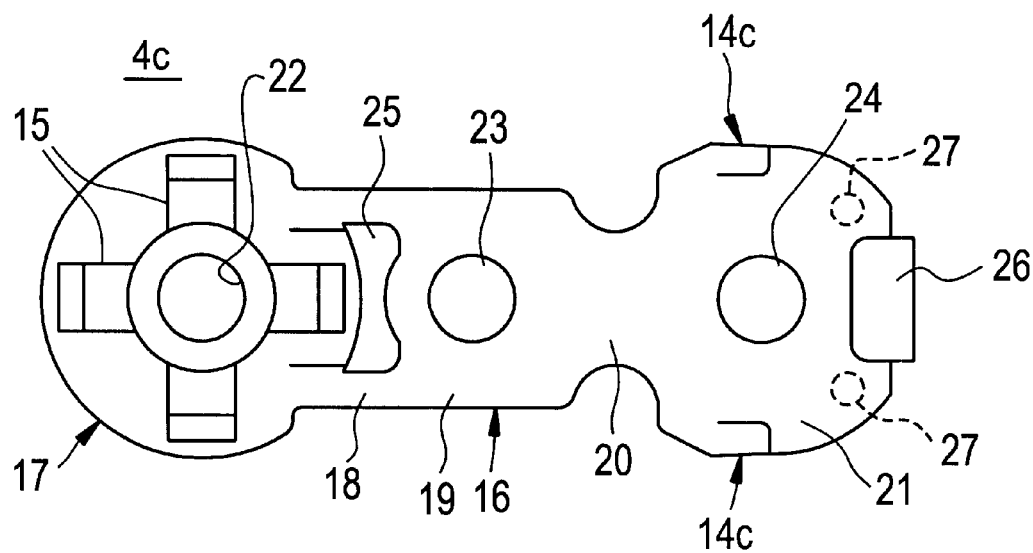
FIG. 13 shows a fourth preferred embodiment of the present invention, and corresponds to FIG. 5.

FIG. 13 shows a fourth preferred embodiment of the present invention, and corresponds to FIG. 5.

The fourth preferred embodiment is characterized in the position of the engagement portions 14c of a driver member 4c. That is, the engagement portions 14c are positioned on the outer sides as compared with the engagement portions 14 indicated by the broken lines in FIG. 8. Thus, the engagement portions 14c are arranged to engage the outermost ends of the pair of the engagement walls 28. Correspondingly, the size in the width direction of the second plate 21 is increased.

In the fourth preferred embodiment, clearances between the engagement portions 14c and the engagement walls 28 are reduced, even if the dimensional accuracy of the engagement portions 14c and the engagement walls 28 is not significantly improved. For this reason, the rotation of the driver member 4c is securely transmitted to the rotor 3. Thus, adjustment of the electrostatic capacitance is more effectively achieved.

Moreover, in the fourth preferred embodiment, the positions of the projected portions 27 are altered to be in contact with the outer peripheral portion of the rotor 3.

With the above-mentioned structure, the rotor 3 is pressed with greatly improved stability through the projected portions 27.

Figure 14:
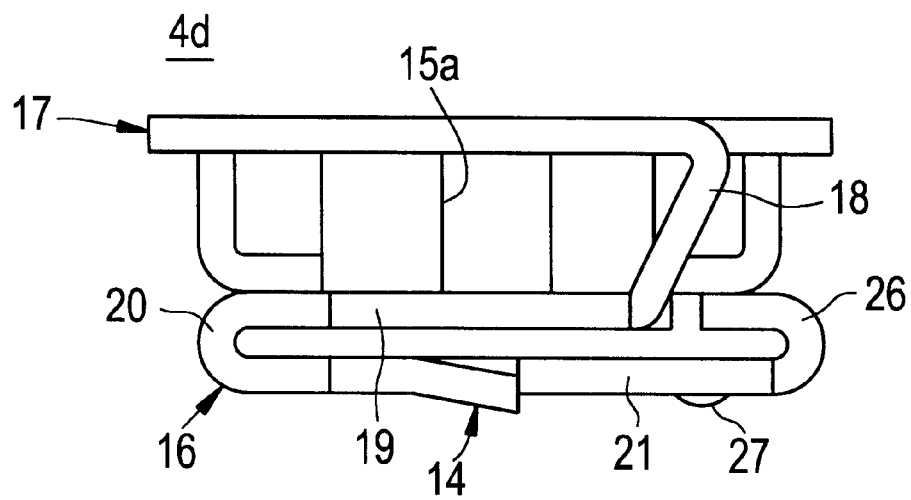
FIG. 14 shows a fifth preferred embodiment of the present invention, and corresponds to FIG. 3.

FIG. 14 shows a fifth preferred embodiment of the present invention, and corresponds to FIG. 3.

In the fifth preferred embodiment, the depths of the driver grooves 15a of a driver member 4d are increased.

In the fifth preferred embodiment, the advantages obtained when the driver grooves are configured such that they do not reach the bottom of the head 17 are not provided. However, a tool such as a screwdriver or other suitable tool is inserted more deeply. Thus, rotation caused by such a tool is more reliably transmitted to the driver member 4d.

Figure 15:
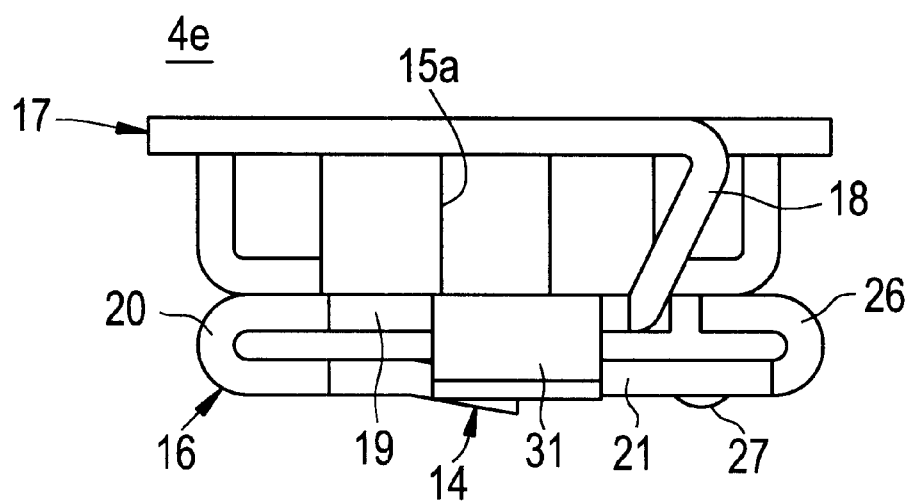
FIG. 15 shows a sixth preferred embodiment of the present invention, and corresponds to FIG. 3.
Figure 16:
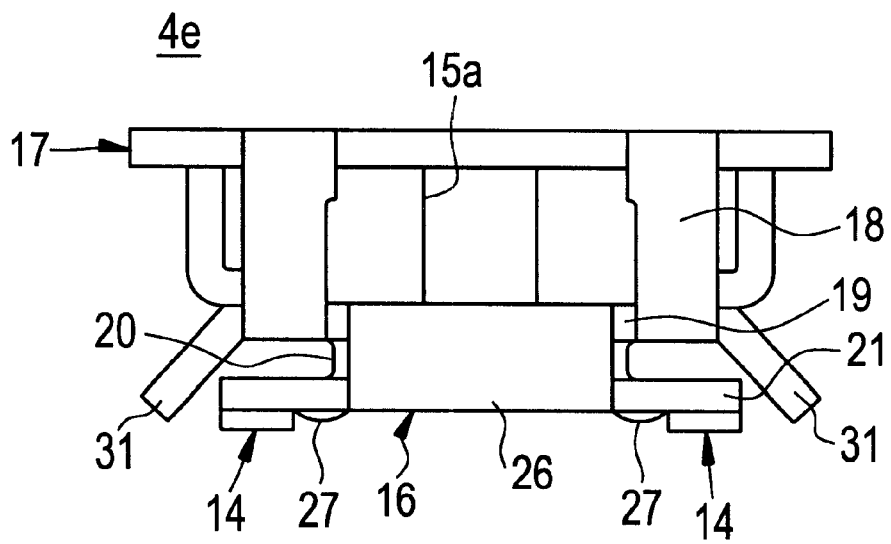
FIG. 16 shows the sixth preferred embodiment of the present invention, and corresponds to FIG. 4.

FIGS. 15 and 16 show a sixth preferred embodiment of the present invention, and correspond to FIGS. 3 and 4, respectively.

In a driver member 4e of the sixth preferred embodiment, the spring function portion 16 is further provided with a pair of auxiliary pressure-contact portions 31 each extending from the side of the first plate portion 19 in a direction to approach the upper side of the rotor 3.

In the sixth preferred embodiment, not only the second plate portion 21, but also the pair of the auxiliary pressure-contact portions 31, are in pressure-contact with the upper side of the rotor 3. Thus, the load applied to the rotor 3 is more uniform. Thus, the rotor 3 is pressed toward the stator 2 with greatly improved stability.

In addition, the auxiliary pressure-contact portions 31 function similarly to the above-described support portions 26. That is, when crimping of the center shaft 8, the second bending portion 20 is prevented from exceeding the elastic limit, and thus being plastically deformed.

Figure 17:
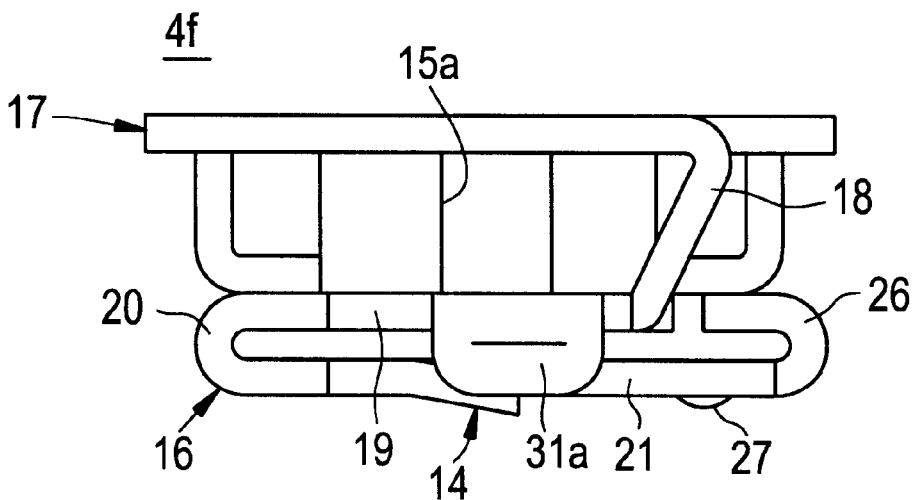
FIG. 17 shows a seventh preferred embodiment of the present invention, and corresponds to FIG. 3.
Figure 18:
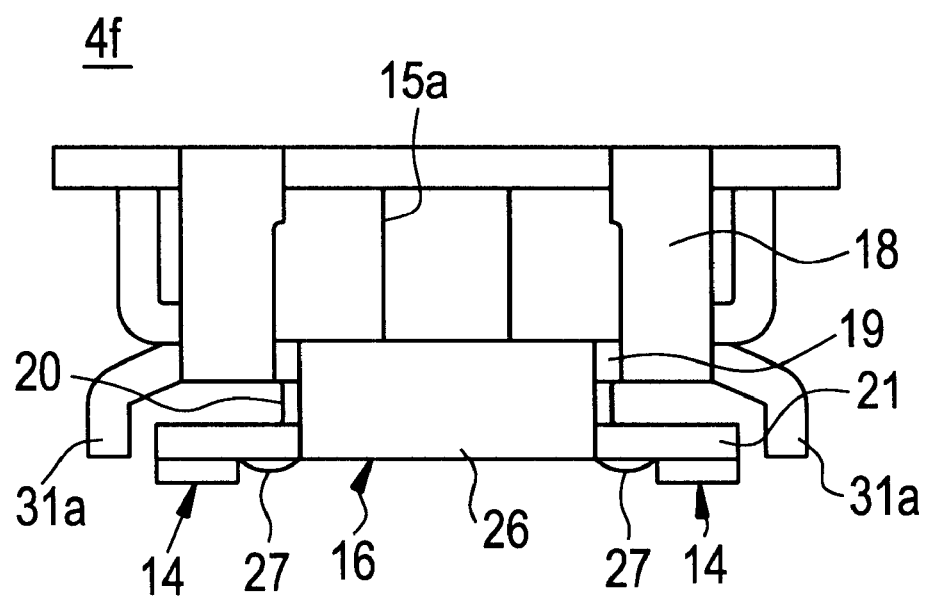
FIG. 18 shows the seventh preferred embodiment of the present invention, and corresponds to FIG. 4.

FIGS. 17 and 18 show a seventh preferred embodiment of the present invention, and correspond to FIGS. 3 and 4, and FIGS. 15 and 16, respectively.

A driver member 4f in the seventh preferred embodiment has the same advantages as the driver member 4e of the above-described sixth preferred embodiment. The driver member 4f is provided with auxiliary pressure-contact portions 31a having the same operation as the auxiliary pressure-contact portions 31. The auxiliary pressure-contact portions 31a are the same as the auxiliary pressure-contact portions 31, except for the shape and size. That is, the auxiliary pressure-contact portions 31a have a bent shape.

The various preferred embodiments of the present invention have been described in reference to the drawings, and various changes and modifications may be made in the invention without departing from the scope thereof.

According to various preferred embodiments of the present invention, the driver member includes one metal sheet in which the head having the driver groove provided therein, the engagement portion, and the spring function portion for pressure-contacting the rotor are integral with each other. Therefore, the number of components is greatly reduced, and moreover, the number of assembling processes is greatly decreased, as compared with such a driver member formed of plural members. As a result, the cost is greatly reduced.

Moreover, the spring function portion provided in the driver member includes a plate portion extending from one end of the head, which is bent from the one end and elongated, passing the center shaft, a portion of the plate portion functioning as a pressure-contact component for the rotor. The length of a portion exerting a spring action is greatly increased. Accordingly, the elastic range produced by the spring function portion is substantially widened. As a result, torque generated by the rotation-operation for the driver member is greatly improved. Moreover, pressure-contact of the rotor against the stator is greatly improved. Thus, the adjusted electrostatic capacitance is maintained constant.

As described above, the length of the portion exerting a spring action in the spring function portion is greatly increased. Accordingly, the elasticity range produced by the spring function portion is greatly increased. A material, even if it is not a material used exclusively in springs or is not especially suitable for use in springs, can sufficiently exhibit spring properties. Therefore, the material cost is greatly reduced.

In the variable capacitor in accordance with the present invention, preferably, the spring function portion includes a first plate portion extending from one end of the head, which is bent in the first bending portion, and extending along the underside of the head, passing the center shaft, and a second plate portion extending from the end of the first plate portion, which is bent in the second bending portion, and extending along the underside of the first plate portion, passing the center shaft, the second plate portion functioning as a portion to be pressure-contacted with the rotor. Accordingly, the length of a portion exerting a spring action is greatly increased. As described above, torque generated by the rotation-operation for the driver member greatly improved, and moreover, the pressure-contact of the rotor against the stator is greatly improved. Thus, the adjusted electrostatic capacitance is securely maintained constant.

When a gap is provided between the first and second plate portions in the above case, the spring action of the spring function portion is achieved principally by the elastic deformation in the second bending portion. Such a structure exerting a spring action is easily provided for the spring function portion. In addition, the support portion is easily achieved by bending the end of the second plate portion such that it approaches the underside of the head.

The above-described support portion, when it is provided, prevents the spring function portion from exceeding the elastic limit, and thus prevents plastic deformation, even if an excessive load is applied to the spring function portion.

When the second plate portion has a convexity provided in the pressure-contact portion for the rotor, the pressure-contact action by the second plate portion is more reliably exerted on the rotor.

Moreover, when the first bending portion has a through-hole provided in the approximate center in the width direction thereof, bending-work in the first bending portion is easily achieved, and moreover, interference of the first bending portion with the head is avoided.

When the spring function portion is further provided with a pair of auxiliary pressure-contact portions each extending from the sides of the first plate portion to approach the upper side of the rotor, a load is uniformly applied from the spring function portion to the rotor, and undesired plastic deformation in the spring function portion is effectively prevented.

When the rotor is configured to surround the center shaft, and includes a pair of engagement walls extended substantially vertically, facing in the same direction, and the engagement portions are engaged with a pair of the engagement walls, engagement of the engagement portions with the rotor is greatly improved, and the rotation of the driver member is reliably transmitted to the rotor.

In the above case, the rotor may be of a substantially semi-circular sheet shape, of which the underside constitutes a substantially semi-circular shaped rotor electrode. When the engagement walls are defined by linear portions of the substantially semi-circular sheet shape, no special processes are required for formation of the engagement walls.

Also, when the engagement portions are arranged to extend from the second plate portions, the second plate portion functions as a pressure-contact component for the rotor. Accordingly, the engagement portions are easily provided and do not interfere with other components.

Moreover, when bent ends having a bent shape are provided on the free ends of the engagement portions, and the bent ends of the engagement portions are engaged with a pair of the engagement walls, the engagement portions effectively and securely contact the engagement walls, even where variations in size or in assembly of the engagement portions and the rotor exist.

Furthermore, when the engagement portions are positioned to engage the outermost ends of a pair of the engagement walls, the range of allowable variations in positional relation between the engagement portions and the engagement walls is greatly increased, and clearances between the engagement portions and the engagement walls are easily reduced. Thus, the electrostatic capacitance is more effectively adjusted.

When the head has a dish-shape, and the driver groove is provided in the side surface of the head in various preferred embodiments of the present invention, and moreover, when the driver groove is arranged such that it does not reach the bottom of the dish-shaped head, undesirable distortions of the bottom of the driver groove during formation of the driver groove are prevented from exerting force on the rotor and the stator. Thus, breakage of the stator is effectively prevented.

While the invention has been particularly shown and described with reference to preferred embodiments thereof, it will be understood by those skilled in the art that the foregoing and other changes in form and details can be made without departing from the spirit and scope of the invention.

What is claimed is:

1. A variable capacitor comprising:

a stator fixedly disposed and including a stator electrode;

a rotor disposed rotatably in contact with the stator and having a rotor electrode opposed to the stator electrode via a dielectric member;

an electrically conductive driver member arranged to be rotation-operated to rotate the rotor, the electrically conductive driver member including an engagement portion engaged with the rotor such that the rotation is transmitted to the rotor, a driver groove arranged to carry out the rotation-operation, and a spring function portion which is disposed in pressure-contact with the rotor to urge the rotor to be elastically pressed against the stator;

an electrically conductive center shaft arranged to rotatably support the rotor and the driver member and being electrically connected to the driver member;

a stator terminal electrically connected to the stator electrode; and a rotor terminal electrically connected to the center shaft;

wherein said driver member is defined by one metal plate in which a head portion having a driver groove, the engagement portion, and the spring function portion are integrally provided with each other;

said spring function portion includes a plate portion which is folded back at one end of the head portion and extends beyond the center shaft, and a portion of said plate portion defines a pressure-contact portion for the rotor.

2. A variable capacitor according to claim 1, wherein the plate portion of the spring function portion includes a first plate portion extending from one end of the head portion, which is bent in a first bending portion, and extending along the underside of the head portion, passing the center shaft, and a second plate portion extending from the end of the first plate portion, which is bent in the second bending portion, and extending along the underside of the first plate portion, passing the center shaft, said second plate portion defining a pressure-contact portion for the rotor.

3. A variable capacitor according to claim 2, wherein a gap is provided between the first plate portion and the second plate portion.

4. A variable capacitor according to claim 3, wherein the spring function portion further includes a support portion defined by bending the end portion of the second plate portion in a direction such that the end portion approaches the underside of the head portion.

5. A variable capacitor according to claim 2, wherein the second plate portion includes a projected portion provided in the pressure-contact portion for the rotor.

6. A variable capacitor according to claim 2, wherein the first bending portion includes a through-hole provided in the approximate center in the width direction thereof.

7. A variable capacitor according claim 2, wherein the spring function portion is further provided with a pair of auxiliary pressure-contact portions each extending from the sides of the first plate portion toward the upper side of the rotor.

8. A variable capacitor according to claim 2, wherein the rotor includes a pair of engagement walls extending substantially vertically, facing in the same direction, the center shaft being disposed between the engagement walls, and the engagement portions of the driver member being engaged with the pair of the engagement walls.

9. A variable capacitor according to claim 8, wherein the rotor has a substantially semi-circular sheet shape, a substantially semi-circular shaped rotor electrode is provided on the underside thereof, and the linear portions of the substantially semi-circular shape of the rotor define the pair of the engagement walls.

10. A variable capacitor according to claim 8, wherein the engagement portions of the driver member are arranged to extend from the second plate portion.

11. A variable capacitor according to claim 8, wherein cut end surfaces of the metal plate in the engagement portions of the driver member are engaged with the engagement walls.

12. A variable capacitor according to claim 8, wherein bent ends having a bent shape are provided in free ends of the engagement portions of the driver member, and the bent ends of the engagement portions are engaged with the pair of the engagement walls.

13. A variable capacitor according to claim 8, wherein the engagement portions of the driver member are arranged to engage outermost ends of the pair of the engagement walls.

14. A variable capacitor according to claim 1, wherein the head portion has a dish-shape, and the driver groove is provided in a side surface of the head portion.

15. A variable capacitor according to claim 14, wherein the driver groove is arranged such that it does not reach the bottom of the dish-shaped head portion.

16. A variable capacitor according to claim 1, wherein the center shaft and the rotor terminal are integral with each other.

17. A variable capacitor according to claim 16, wherein the variable capacitor includes a resin case, said resin case having a cavity fixedly accommodating the stator, and rotatably accommodating the rotor and the driver member, and is integral with the stator terminal and the rotor terminal.

18. A variable capacitor according to claim 1, wherein the stator is made of a dielectric material and has the stator electrode provided on the underside thereof, the rotor is electrically conductive and is disposed rotatably in contact with the upper side of the stator, and the rotor electrode is provided on the underside of the rotor so as to oppose the stator electrode via the stator.

* * * * *